US009783086B2

(12) United States Patent
Parker et al.

(10) Patent No.: US 9,783,086 B2
(45) Date of Patent: Oct. 10, 2017

(54) SEAT SYSTEM FOR A VEHICLE

(71) Applicant: Bose Corporation, Framingham, MA (US)

(72) Inventors: Robert Preston Parker, Westborough, MA (US); Lawrence D. Knox, Hopkinton, MA (US); Travis Lee Hein, Holliston, MA (US); Steven N. Brown, Hopkinton, MA (US); Brian A. Selden, Concord, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/476,914

(22) Filed: Mar. 31, 2017

(65) Prior Publication Data

US 2017/0203673 A1    Jul. 20, 2017

Related U.S. Application Data

(63) Continuation-in-part of application No. 13/868,741, filed on Apr. 23, 2013.

(51) Int. Cl.
*B60N 2/39* (2006.01)
*A01D 34/86* (2006.01)
*B60N 2/24* (2006.01)
*B60N 2/38* (2006.01)
*B60N 2/02* (2006.01)

(52) U.S. Cl.
CPC ............... *B60N 2/39* (2013.01); *A01D 34/86* (2013.01); *B60N 2/24* (2013.01); *B60N 2/38* (2013.01); *B60N 2002/0212* (2013.01); *B60N 2002/0272* (2013.01)

(58) Field of Classification Search
CPC .................................. E02F 9/163; B60N 2/39
USPC ................... 296/65.05, 68.1, 65.08, 190.05; 180/89.15, 89.14; 248/371; 297/314
See application file for complete search history.

(56) References Cited

U.S. PATENT DOCUMENTS

| 5,857,535 | A  | * | 1/1999  | Brooks ..................... B60N 2/39 180/282 |
| 6,026,920 | A  | * | 2/2000  | Obeda .............. B60G 17/01908 180/326 |
| 6,068,280 | A  | * | 5/2000  | Torres ..................... A61G 5/045 180/328 |
| 7,614,699 | B2 | * | 11/2009 | Torres ..................... A61G 5/045 297/344.14 |
| 7,822,523 | B2 | * | 10/2010 | Yoshida ............... B60N 2/0232 297/284.9 |
| 2007/0260383 | A1 | * | 11/2007 | Sundaram ......... B60W 50/0205 701/70 |
| 2011/0276233 | A1 | * | 11/2011 | Lofstrand ................ A61G 5/04 701/49 |

(Continued)

*Primary Examiner* — Jason S Morrow
(74) *Attorney, Agent, or Firm* — Brian M. Dingman; Dingman IP Law, PC

(57) ABSTRACT

A seat system for a vehicle includes a seat having a seat bottom on which a person can sit. An intermediate support structure is secured to the seat and the vehicle which allows the seat to rotate relative to the vehicle. An actuator can interact with the seat to cause the seat to rotate relative to the vehicle. The combined motion of the vehicle relative to the earth and the seat relative to the vehicle results in motion of the seat moving about a virtual pivot point. A user control is provided for adjustment of the location of the virtual pivot point.

20 Claims, 9 Drawing Sheets

(56) References Cited

U.S. PATENT DOCUMENTS

| | | | |
|---|---|---|---|
| 2012/0161485 A1* | 6/2012 | Stockwell | B60N 2/39 297/344.11 |
| 2012/0267503 A1* | 10/2012 | Gribble | B60N 2/39 248/393 |
| 2013/0131923 A1* | 5/2013 | Tzipman | B62D 24/04 701/38 |
| 2015/0081171 A1* | 3/2015 | Ericksen | B60G 17/016 701/37 |

* cited by examiner

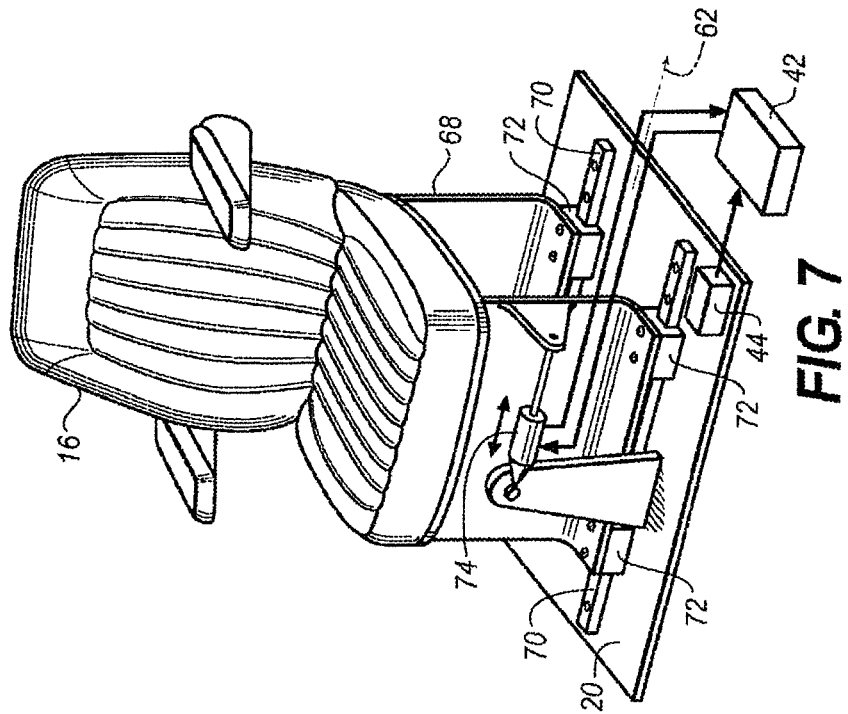
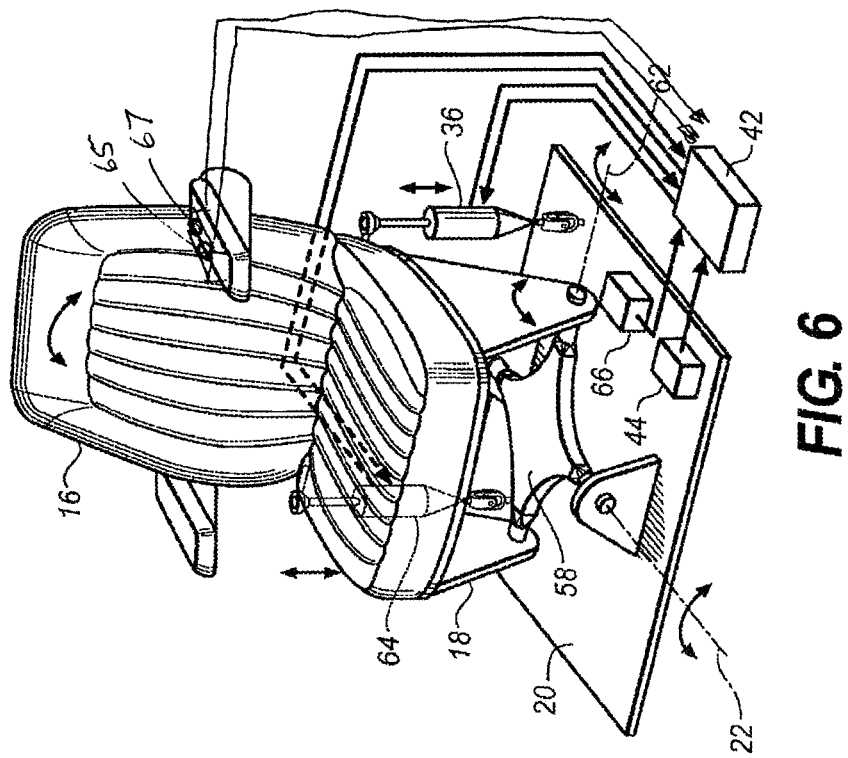
FIG. 6
FIG. 7

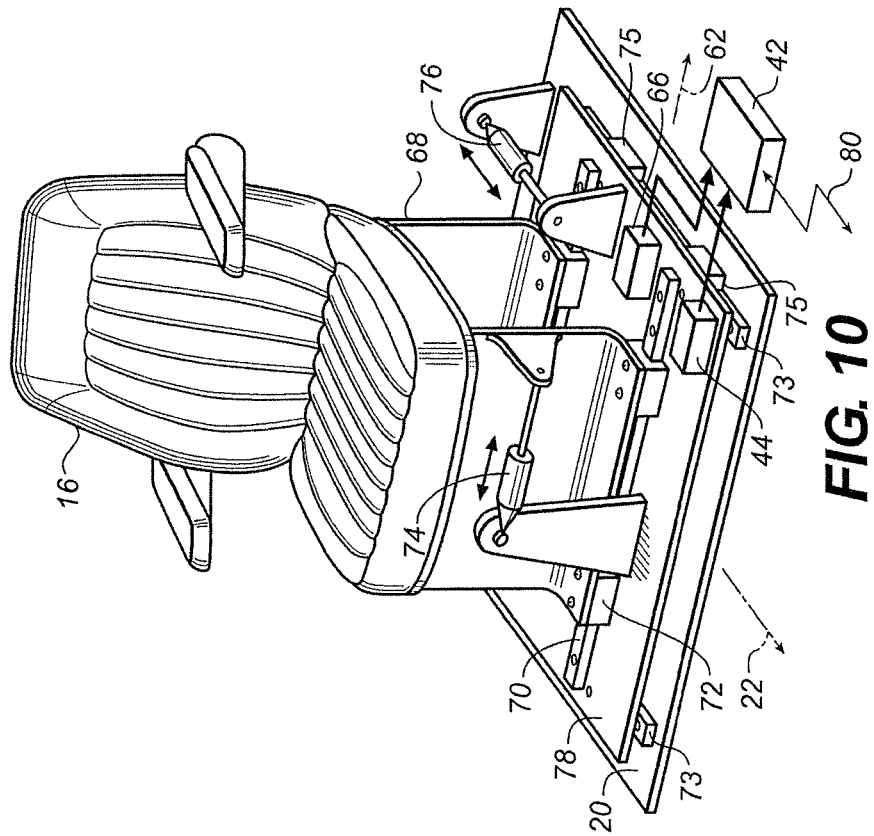
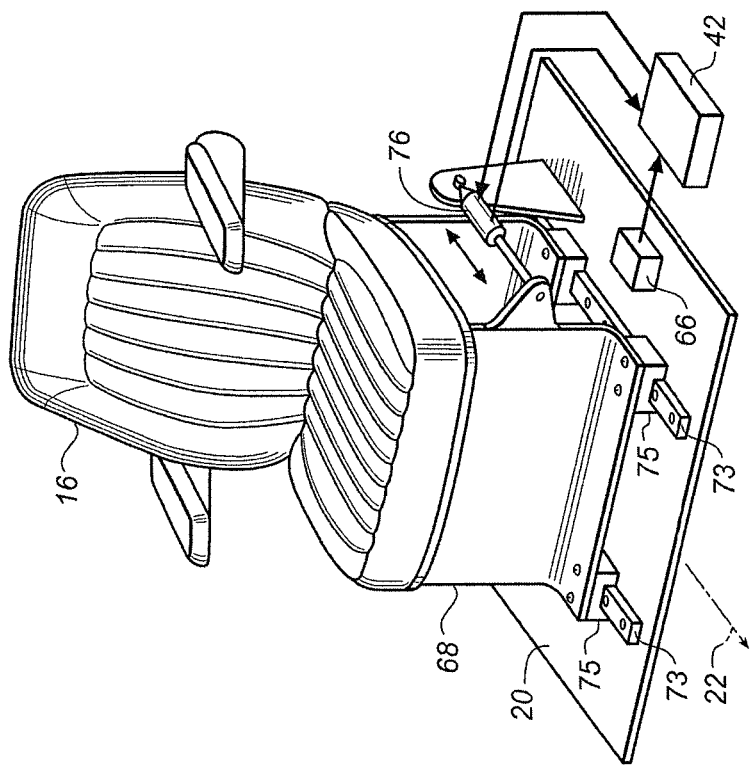

SEAT SYSTEM FOR A VEHICLE

CROSS-REFERENCE TO RELATED APPLICATION

This application is a continuation in part of U.S. application Ser. No. 13/868,741 filed Apr. 23, 2013, now pending, the contents of which are incorporated herein by reference in their entirety.

BACKGROUND

This disclosure relates to a seat system for a vehicle. In an X, Y, Z coordinate system, a person can be subject to motion in six degrees of freedom. These degrees of freedom include rotation about the X, Y and Z axes, and translation substantially parallel to each of these axes. When traveling in a vehicle such as a farm tractor or a car, a person can be quite sensitive to vehicle rotations about roll and pitch axes. As such, passengers in vehicles with relatively stiff suspensions (e.g. farm tractors, sports cars) can be made uncomfortable when the vehicle starts rocking side-to-side and/or pitching back and forth due to an uneven surface over which the vehicle is traveling.

U.S. Pat. No. 5,857,535 discloses a low aspect self-propelled vehicle (1) operated by a driver (4) sitting on top of it, has its seat (7) supported from beneath by a flange (12) which is pivoted to tilt about a horizontal axis (15) in the mid-vertical plane of the vehicle. The spacing between the axis (15) and the seat (7) is sufficient to ensure that when the seat is tilted about the axis by operation of a tilt control mechanism (21), the center of seat also displaces a significant extent in the uphill direction of the slope. This reduces the downhill movement of the center-of-gravity (10) of the combination of vehicle plus driver, so that the risk of the vehicle toppling is reduced.

SUMMARY

In one aspect, a seat system for a vehicle includes an active suspension system for isolating a suspended plant from vibration applied to a base of the active suspension when the active suspension base is affixed to a vehicle. The active suspension system is constructed and arranged to isolate the suspended plant from vibration in a first degree of freedom selected from the group consisting of: vehicle roll and vehicle pitch. A seat is affixed to the suspended plant. The active suspension system includes an actuator for outputting force to affect the suspended plant in the first degree of freedom, sensors to sense motion of the suspended plant in the first degree of freedom, and a controller for providing a command to the actuator to cause it to output force to affect motion of the suspended plant. The combined motion of the vehicle relative to the earth in the first degree of freedom with the motion of the suspended plant relative to the vehicle results in a motion of the suspended plant which pivots about a virtual pivot point having a height. The active suspension further includes a user operable control constructed and arranged to allow the user to adjust the height of the virtual pivot point.

Embodiments may include one or more of the following features. The active suspension causes the suspended plant to pivot with respect to the suspension base about a first axis, where the user control controls the height of the virtual pivot point above the first axis. The user control allows the user to continuously vary the virtual pivot point height above the first axis over a first range of heights, where the first range extends from the height of the first axis to a height at least as high as the top of the head of an occupant of the seat. The user control allows the user to continuously vary the virtual pivot point height above the first axis over a first range of heights, where the first range extends from the height of the first axis to the height of a roof of the vehicle interior. The user control allows the user to vary the virtual pivot point height above the first axis among a plurality of predetermined heights. One of the plurality of predetermined heights is the average height at which an occupant of the seat holds reading material. One of the plurality of predetermined heights is a height between about 6 to 12 inches above of the lap of an occupant of the seat. One of the plurality of predetermined heights is the height of a top surface of a tray arranged for use by the occupant of the seat. A location sensor for sensing its vertical height within the vehicle and outputting its height information to the controller, wherein the controller outputs commands to the actuator to cause it to output forces such that the height of the virtual pivot point is set at the vertical height of the location sensor. The location sensor senses acceleration in at least one degree of freedom. The physical location of location sensor in the vehicle is capable of being changed by a seat occupant. The location sensor is capable of being fixed to the suspended plant. A sensor for detecting a condition of the seat, wherein the location of the virtual pivot point is automatically changed when the sensor detects the condition. The condition is a user change in seat position.

In another aspect, a seat system for a vehicle includes an active suspension system for isolating a suspended plant from vibration applied to a base of the active suspension when the active suspension base is affixed to a vehicle. The active suspension system is constructed and arranged to isolate the suspended plant from vibration in a first degree of freedom selected from the group consisting of: vehicle roll and vehicle pitch. A seat is affixed to the suspended plant. The active suspension system includes an actuator for outputting force to affect the suspended plant in the first degree of freedom, sensors to sense motion of the suspended plant in the first degree of freedom, and a controller for providing a command to the actuator to cause it to output force to affect motion of the suspended plant. The combined motion of the vehicle relative to the earth in the first degree of freedom with the motion of the suspended plant relative to the vehicle results in a motion of the suspended plant which pivots about a virtual pivot point having a height. A tray is associated with the seat system. A user operable control is constructed and arranged to allow the user to adjust the height of the virtual pivot point, wherein the virtual pivot point height is automatically set to a first height when the tray is stowed, and the virtual pivot point is automatically set to a second height when the tray is deployed.

Embodiments may include one or more of the following features. A first time delay is used to delay between the time the tray is deployed and the time the virtual pivot point height is changed from the first height to the second height. A second time delay is used to delay between the time the tray is stowed and the time the virtual pivot point height is changed from the second height to the first height.

In another aspect, a seat system for a vehicle includes an active suspension system for isolating a suspended plant from vibration applied to a base of the active suspension when the active suspension base is affixed to a vehicle. The active suspension system constructed and arranged to isolate the suspended plant from vibration in a first degree of freedom selected from the group consisting of: vehicle roll and vehicle pitch. A seat is affixed to the suspended plant.

The active suspension system includes a first actuator for outputting force to affect the suspended plant in the first degree of freedom, sensors to sense motion of the suspended plant in the first degree of freedom, a controller for providing a command to the first actuator to cause it to output force to affect motion of the suspended plant. The combined motion of the vehicle relative to the earth in the first degree of freedom with the motion of the suspended plant relative to the vehicle results in a motion of the suspended plant which pivots about a first virtual pivot point having a height. The active suspension includes a second actuator for outputting second forces to affect the suspended plant in a second degree of freedom to generate second compensated motion so that the suspended plant is controlled in both the vehicle roll and vehicle pitch degrees of freedom. The combined motion of the vehicle in the second degree of freedom with the compensated motion of the suspended plant in the second degree of freedom results in a motion of the suspended plant in the second degree of freedom that effectively pivots about a second virtual pivot point associated with the second degree of freedom, the second virtual pivot point also having a height. A user operable control constructed and arranged to allow the user to adjust the height of the first virtual pivot point.

Embodiments may include one or more of the following features. The user control allows the user to control the heights of both the first and second virtual pivot points.

In another aspect, a seat system for a vehicle includes a seat including a seat bottom on which a person can sit, wherein a first imaginary reference vertical centerline passes through a body of a person who is sitting in the seat when both the seat and the vehicle are in a nominal, level horizontal orientation. An intermediate support structure secured to the seat and the vehicle which allows the seat to move relative to the vehicle. A first actuator that can interact with the seat to cause the seat to move relative to the vehicle. One or more sensors which can each measure an aspect of motion. A processor that can (i) receive input from each of the one or more sensors, and (ii) utilize the input to determine a desired movement of the seat relative to the vehicle such that a combined motion of the seat relative to the vehicle and the vehicle relative to earth results in motion of the person about a virtual pivot point located substantially along the reference vertical centerline. A user operable control which allows the user to control the location of the virtual pivot point.

BRIEF DESCRIPTION OF THE DRAWINGS

FIG. 6 is a perspective view of another example of a seat system in which the seat can be rotated about two axes;

FIG. 7 is a perspective view of another example of a seat system in which the seat can be translated substantially parallel to a first axis;

FIG. 9 is a perspective view of another example of a seat system in which the seat can be translated substantially parallel to a second axis;

FIG. 10 is a perspective view of another example of a seat system in which the seat can be translated substantially parallel to two axes.

DETAILED DESCRIPTION

The description below relates to a seat system for a vehicle. When a vehicle is rocked from side-to-side and/or fore/aft due to a disturbance in the road surface, the driver of the vehicle also experiences this motion. With the seat system discussed below, when the vehicle is rocked in one direction, the seat is rotated or translated relative to the vehicle in the opposite direction. As a result, acceleration of the driver's head in a horizontal direction is substantially reduced which results in a more pleasing driving experience for the driver.

Figure 1A:
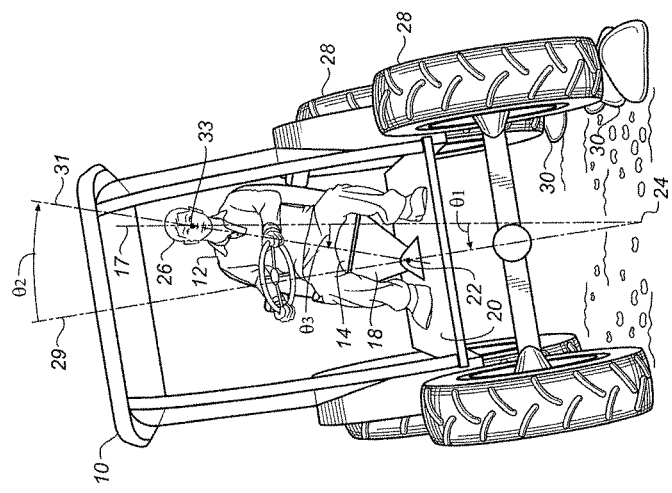
FIG. 1A is front view of a tractor.

Turning to FIG. 1A, a vehicle 10 in the form of a tractor is shown driving in a straight line on a substantially level road surface. Not all portions of the vehicle are shown in order to facilitate this description. A person 12 is sitting on a bottom 14 of a seat 16 which is part of a seat system that will be described in further detail below. The person is sitting in a substantially vertical orientation along an imaginary reference vertical centerline 17 which passes through the body of the person 12 who is sitting in the seat 16 and an axis 22 (explained further below). In this example the vertical centerline 17 bisects the person 12 and seat 16 when both the seat and the vehicle are in a nominal, level horizontal orientation as shown in FIG. 1. This is because the seat system is substantially symmetrical as viewed in FIG. 1A. In other types of vehicles, the seat system may be located to the left or right of the vertical centerline 17.

An intermediate support structure 18 is secured to the seat 16 and to a floor 20 of the vehicle 10 (structure 18 may be considered part of the seat 16). The intermediate support structure 18 allows the seat 16 to move/rotate relative to the vehicle about an axis 22 which is substantially parallel to a direction in which the vehicle 10 is moving when the vehicle is traveling in a straight line (if the seat 16 can be rotated so that it is not facing forward, the axis 22 may be skewed relative to this direction). In this example the axis 22 is closer to the floor 20 than to the seat bottom 14, and is preferably non-intersecting with a horizontal plane. The axis 22 can be located lower or higher than shown, but the seat 16 is preferably connected to the vehicle 10 at or near the floor 20. The axis 22 is fixed relative to the vehicle 10. Factors such as the distance it is desired to move the person's head about the axis 22, and sway space requirements (interference between seat parts and other portions of a vehicle cab 11 as the seat rotates) can be considered in choosing the height of axis 22 above the floor 20. The vehicle 10 can roll about an axis 24 which is substantially parallel with the axis 22.

In an alternative example, an asymmetrical seat system may be used. This can occur if, for example, a relatively large user interface for controlling the vehicle is mounted on one of two arm rests of the seat system (e.g. as on some farm tractors). In order to balance the seat over the axis 22, the seat 16 (including the seat bottom 14) will be offset relative to the support structure 18. For example, as viewed in FIG. 1A, if the user interface is mounted on the left armrest, the seat 16 will be mounted to the support structure 18 in an offset position to the right of center so that the seat system is balanced over the axis 22. It is preferred that the vertical centerline 17 passes through the axis 22 and the center of gravity of the seat 16 when the vehicle 10 is oriented as shown in FIG. 1A. As such, with an asymmetrical seat system (e.g. the seat is offset to the right as viewed in FIG. 1A to offset the weight of a large user interface on the left armrest of the seat), the vertical centerline 17 may pass through a different portion of the body of the person 12 (e.g. through the left ear of the person 12 as viewed in FIG. 1A).

A distance $L_1$ represents the length between the axis 22 and the axis 24. A distance $L_2$ represents the length between the axis 22 and a center of a head 26 of the driver 12. The distance $L_2$ is preferably assumed to be associated with a human being of above average height who is sitting in the seat 16 as opposed to setting $L_2$ to be associated with a human being of average or below average height who is sitting in the seat 16. Preferably, the top end of $L_2$ will reside at or above a position associated with a person's head who is sitting in the seat. It is preferred that $L_2$ will be in the range of about 3-5 feet.

Figure 1B:
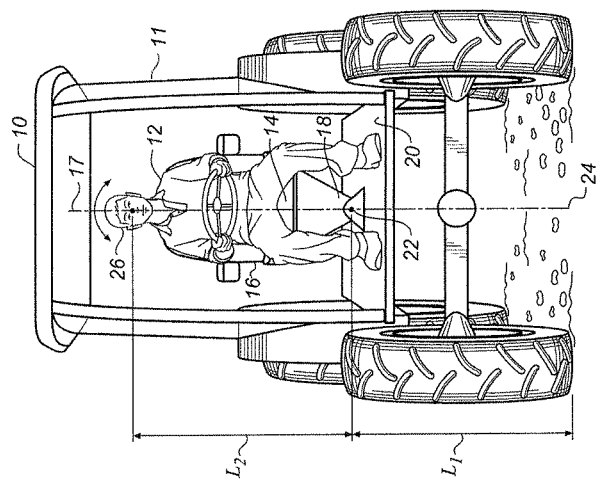
FIG. 1B shows the tractor of FIG. 1 in a tilted orientation.

Referring to FIG. 1B, the left tires 28 of the vehicle 10 have hit obstacles 30 while the vehicle travels in a straight line which causes the vehicle to move relative to earth (the surface over which the vehicle is traveling). As a result, the vehicle 10 has rotated counter-clockwise (when viewed from the front here and in like descriptions below) about the bottom of the right tires of the vehicle. Rotation about an axis 24 is an acceptable small angle approximation for the rotation of the vehicle 10 about the bottom of the right tires and is used for symmetry reasons. The vehicle 10 has approximately rotated by an angle $\Theta_1$ which is the angle between the vertical centerline 17 and a vehicle centerline 29. If the seat 16 is not secured in the center of the vehicle 10 as in FIG. 1A (meaning the seat is positioned to one side or the other of center), then $\Theta_1$ is determined by the rotation of the vehicle centerline 29 from the nominal position in FIG. 1A to a rotated position (e.g. in FIG. 1B). As the vehicle rotates counter-clockwise, the seat is automatically rotated clockwise (in the opposite direction to the roll of the vehicle) by an actuator (discussed in further detail below) about the axis 22 by an angle $\Theta_2$ which is the angle between the vehicle centerline 29 and a seat centerline 31. The actuator causes the seat 16 to rotate about the axis 22 (pivot point) in an opposite sense relative to the rotation of the vehicle. Rotation of the seat 16 about the axis 22 in FIG. 1B is clockwise for a counterclockwise rotation of the vehicle 10 (e.g. about the axis 24). More details of how the seat is automatically rotated will be provided below. The angle $\Theta_2$ is calculated as follows by the processor: $\Theta_2 = \Theta_1 \times (1 + L_1/L_2)$. This equation shows why locating the axis 22 close to the floor 20 is preferable. If $L_1$ increases relative to $L_2$ (the axis 22 is moved up away from the floor 20), $\Theta_2$ increases. This means the seat 16 would have to be rotated through a larger angle to compensate for a fixed amount of vehicle roll as the axis 22 is moved up. This equation also shows that in this example $\Theta_2$ will always be more than insubstantially larger than $\Theta_1$. As a result, the person 12 is rotated about a position associated with their head 26 to substantially reduce or minimize side-to-side and/or front/back (discussed below) movement (i.e. acceleration in a horizontal direction) of the person's head. Preferably the head 26 remains substantially on the original vertical centerline 17. It should be noted that if the vehicle rotates through too large an angle (e.g. about axis 24), the seat may be rotated to its travel limit and not be able to rotate further to address the full angle of rotation of the vehicle. This would result in the head 26 of the person 12 not remaining on the vertical centerline 17. In an alternative example, the axis 22 can be located below the floor 20. A hole can be created in the floor, and the support structure 18 can be made longer in a vertical direction. This causes $L_1$ to decrease and to $L_2$ to increase, resulting in a relatively smaller $\Theta_2$ (see the equation above).

The person 12 has not just been rotated so that they remain in a vertical position: they have been rotated beyond a vertical position. In other words, a combined motion of the seat 16 relative to the vehicle 10 and the vehicle 10 rotating (e.g. about the axis 24) results in motion of the person 12 about a virtual pivot point 33 located substantially along the reference vertical centerline 17. The virtual pivot point 33 is the intersection of the reference vertical centerline 17 with the seat centerline 31 as the seat 16 is displaced in space relative to earth. The virtual pivot point 33 is located at least above the location of the axis 24 (the vehicle rotation center). Preferably, the virtual pivot point 33 is located above the floor 20 of the vehicle 10. Even more preferably, the virtual pivot point 33 is located above the axis 22 (or the level where relative translation of the seat 16 with respect to the vehicle 10 occurs). Still further preferably, the virtual pivot point 33 is located above a position of a torso of the person 12 (assuming this person is of nominal height) when seated in the seat. Yet further preferably, the virtual pivot point 33 is located at or above a position of a center of the head of the person 12 (assuming this person is of nominal height) when seated in the seat. Preferably the virtual pivot point is about 1-4 feet above a surface of the seat bottom 14 on which the person can sit. More preferably the virtual pivot point is about 2-3 feet above a surface of the seat bottom 14 on which the person can sit. In FIG. 1B the virtual pivot point 33 is located at approximately the center of the head of the person 12. Another way to describe the motion of the person 12 is that they are like a swinging pendulum with the center of their head being the pivot point. A third angle $\theta_3$ is the absolute angle of rotation of the seat off the vertical centerline 17 (more discussion is provided below relative to $\theta_3$).

In one example, a user is provided a control for adjusting the virtual pivot point location along reference vertical centerline 17. As described above, the angle $\theta_2$ which is the angle that the seat is commanded to rotate when the vehicle sees a roll angle input of $\theta_1$ degrees, is dependent upon the distance L2, which is the distance between axis 22 and the virtual pivot point location. By adjusting the value of L2, the location of the virtual pivot point is adjusted. $\theta_2$ is still calculated based on the equation given earlier, but now L2 is a variable controlled by the user operable control. A user may have a preference for seat motion that results with a particular choice of virtual pivot point location. A user may have a preference for different virtual pivot point locations when engaging in different activities in the vehicle (such as driving, eating, reading, sleeping, etc.). Providing a user control which the user can operate to adjust the virtual pivot point location allows the user to adjust the virtual pivot point location to their liking.

Different users may have different preferences for the virtual pivot point location. This may be due to differences in individual preferences of the resulting motion, differences in torso height among users, or both. A user control for adjusting virtual pivot point location allows different users to adjust the virtual pivot point location to accommodate their individual preferences. In one non-limiting example, the user control for controlling the location of the virtual pivot point controls the height of the virtual pivot point. The height can be determined relative to a chosen reference point which may be the floor of the vehicle, the location of axis 22, or any other convenient reference point. While only mentioned in the context of one example above, it should be understood that the user control described in any of the examples disclosed herein may adjust the height of the virtual pivot location above a predetermined reference point.

In one non-limiting example, a seat system allows the virtual pivot point location to be changed to accommodate a reading activity. It may be desirable for the virtual pivot point location to be displaced away from a point aligned with the user's head. The virtual pivot point location may be aligned with the approximate vertical location (height above the axis 22) of the material the user is reading. A setting can be provided for the user control which is identified to the user as a "reading setting" which sets the location of the virtual pivot point to be approximately even with the average vertical height at which a user would hold reading material. For example, the reading setting may set the virtual pivot point height to be between 6 and 12 inches above the top surface of the seat bottom cushion.

In one non-limiting example, a user control incorporates a plurality of settings for different virtual pivot point locations from which the user can choose. In another example, the user control allows continuous adjustment of the virtual pivot point location over a range of virtual pivot point locations. In one non-limiting example, the range may be bounded to be no lower than axis 22 and no higher than the roof of the vehicle. In other examples, the range may be larger or smaller than the above range. In one non-limiting example, the range extends between the height of axis 22 and the top of the occupant's head. In one non-limiting example, the range extends between the height of a seat occupant's lap and a point at least as high as the top of the user's head.

In one non-limiting example, a seat system provides an indication of the location of the virtual pivot point. The control may have an indication on the control itself which indicates the actual location of the virtual pivot point, or the control may have a relative indicator to indicate where within a range of possible locations of virtual pivot points the control is set. Alternatively, or additionally, the seat system may incorporate a display device capable of displaying various information to the user, which in this example may include the virtual pivot point location. The display device may be an LCD screen. In one non-limiting example, the display device includes a touch interface, and the location of the virtual pivot point can be set using the touch interface. In one non-limiting example, the user indicates, on a graphic representation of the seat presented on the touch display device, where they wish to set the virtual pivot point location. Numerous other control types and indicators are possible, and the device is not limited in the manner in which the user control for varying the virtual pivot point is implemented, nor the manner in which the virtual pivot point location is indicated. Other non-limiting examples of controls are rotary knobs with indication marks thereon, slide controls, rotary switches, and rotary knobs or sliding controls with detents to represent specific fixed virtual pivot point locations. Any known devices used for controlling variable elements in electronic or electro-mechanical systems may be used and are contemplated herein.

In one non-limiting example, the seat system automatically adjusts the virtual pivot point location when a condition is detected, such as detecting whether a tray associated with the seat is in a stowed position or a deployed condition. When the tray is in a deployed condition, the virtual pivot point location is set to be at the vertical height of the tray above the axis 22. Other possible conditions might be whether or not an object is on the tray while it is in its deployed state, any user seat adjustment such as the angle of the seat back, the seat height, or the headrest position. Other conditions are also possible and the conditions are not limited to just those conditions listed herein.

In one non-limiting example, sensor(s) is/are used to detect whether or not the tray is deployed and whether or not it is being used. Non-limiting examples of known sensor types useable for detecting if a tray is deployed are simple switches, optical sensors, strain gauges, position sensors, or other known sensors useable for detecting the position of an object. Non-limiting examples of known sensor types useable for detecting if an object is located on a deployed tray are optical sensors, strain sensors, force sensors, contact or proximity sensors and the like. In one non-limiting example, automatic adjustment of the virtual pivot point location depends on whether or not the tray is deployed and whether or not any objects are resting on the tray. It is assumed that if the tray is deployed and objects are on the tray that the user has focused attention on the tray, and the virtual pivot point location is then set to be the vertical height of the tray. In one non-limiting example, if objects are subsequently removed from the tray, the virtual pivot point location may be switched back to its previous setting.

A time delay may be used to control when an automatic adjustment of the virtual pivot point location once a changed condition (such as tray deployment, seat adjustment and the like) is sensed. In one non-limiting example, the time delay is between 0 second (i.e. immediate) and one minute. The time delay can be predetermined or may be user adjustable via a user interface of the seat system. Different time delays may be used when switching between different states of different conditions. For example, adjusting the seat back angle of the seat may result in an immediate change in the virtual pivot point location, while deploying or stowing away a tray may have a predetermined time delay between the time the tray is deployed or stowed and the time the virtual pivot point location is changed. The time delay associated with going from a first state of a condition to a second state may be different than the time delay used when going back from the second state of the condition to the first state. For example, a delay used when switching from a stowed state to a deployed state of a tray may differ from a time delay used when switching from a deployed state to a stowed state of the tray.

In one non-limiting example, a sensor is used to determine where the virtual pivot point location should be set. The virtual pivot point location is set to be at whatever the vertical height of the sensor is. The user can place the sensor in or on whatever object they are focusing attention on (such as reading material, a laptop, food items, eating utensils, writing implements and the like). One example sensor useful for tracking the location in space of an object is the ICM20690 6 axis motion tracking device manufactured by Invensense with headquarters in San Jose, Calif. There are numerous other motion sensing devices that are known that can be used, and sensors are not limited to 6 axis devices. Since only the vertical height above the axis 22 is needed and absolute position in space is not required, other motion sensors (such as a 3-axis accelerometer) can provide sufficient information. Other sensors such as position sensors, ultrasonic sensors, optical sensors could also be used. Any sensor capable of providing the vertical height of its location in a known space can be used and is contemplated herein.

With regard to the above discussion of changing the virtual pivot point location, all of the described examples can be used individually or in various combinations, and applications are not limited to the specific examples described. Seat systems are contemplated that allow either or both manual and automatic setting of virtual pivot point locations. In examples of seat systems incorporating both manual and automatic virtual pivot point location setting, the systems may be set up so that manual settings override automatic operation. Seat system user controls may allow a user to continuously vary the virtual pivot point location, switch between a plurality of discrete virtual pivot point locations, or do both. The seat systems may or may not indicate the virtual pivot point location to the user. Seat systems that indicate the virtual pivot point location may provide relative or absolute virtual pivot point location information, or a combination of both. The indication may be provided using any known method to indicate such data, as described above. Any of the seat systems may use sensors in the various ways described.

Figure 2:
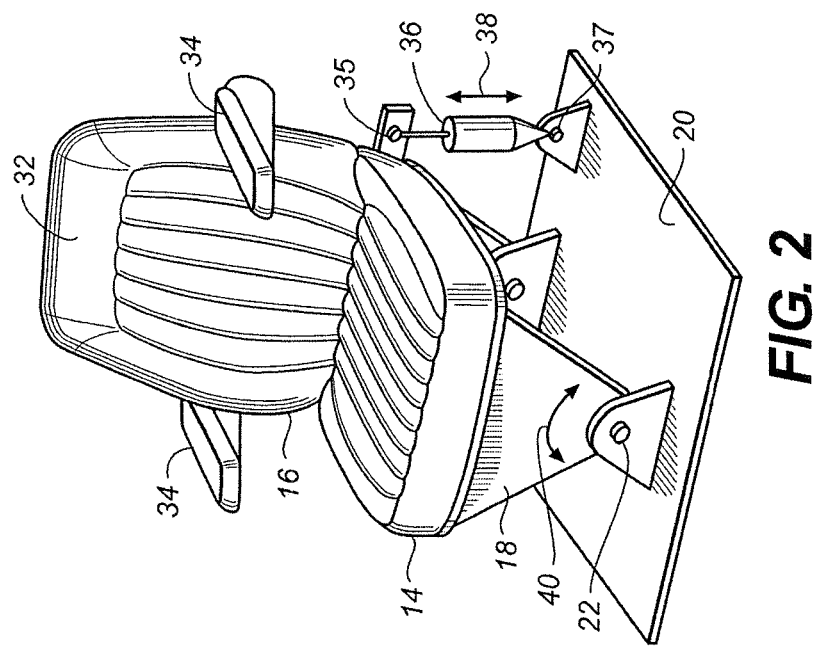
FIG. 2 is a perspective view of a seat used in the tractor of FIG. 1A.

With reference to FIG. 2, the seat 16 is shown with its bottom 14 and a seat back 32 which is connected to the bottom 14. A pair of arms 34 extend forward from the seat back 32. An advantage of this seat system is that any impact of the arms 34 against a torso of the person 12 due to side-to-side rocking of the vehicle 10 will be substantially reduced (or minimized). A similar improvement will occur on the seat back whereby the lateral translation of the seat back relative to a person's back will also be substantially reduced. A linear actuator 36 is pivotally connected to the seat 16 (at a location 35) and can interact with the seat 16 to cause the seat 16 to rotate about the axis 22. In this example, the linear actuator 36 is also pivotally connected to the floor 20 of the vehicle 10 at a location 37. The linear actuator 36 is extended or retracted in the direction of a two-headed arrow 38 to cause the seat to rotate about the axis 22 in the direction of a two-headed arrow 40. The linear actuator 36 can be, for example, an electromagnetic linear motor, a hydraulic cylinder, or a pneumatic cylinder. The linear actuator 36 instead can be some other type of actuator such as a rotary actuator (electromagnetic, hydraulic, or pneumatically powered) that is coupled between the seat 16 and the floor 20. Any type of actuator can be directly coupled to the seat or it may act thru some type of gear train, linkages, or other transmission mechanism. The actuator 36 can be connected to a different portion of the seat 16 and a different portion of the vehicle 10 (other than the floor 20, e.g. a wall of the driver compartment). Control of the actuator is discussed below.

The seat 16 described above has only a single degree of freedom about the axis 22 (a roll axis) relative to the vehicle 10. This single degree of freedom could instead be about a pitch axis. In this case, the axis 22 is oriented side-to-side as viewed in FIG. 1A and allows the seat 16 to be controlled for backwards and forwards pitching. In another example, the seat 16 may be outfitted with one or more additional actuators (not shown) to provide movement of the seat in one or more additional degrees of freedom. For example, instead of mounting the intermediate support structure 18 to the floor 20, the intermediate support structure 18 can be mounted to a platform (not shown) which is moved up and down in the vertical direction by an additional actuator to reduce the vertical vibrations felt by the driver as the vehicle travels over a road (or this vertical actuator can be interposed between the structure 18 and the seat 16). An example of this type of vertical active suspension system is shown in U.S. Pat. No. 8,095,268 which is incorporated herein by reference. The vertical active suspension system can be operated independently of the rotating seat system (or the translating seat system described below). The $L_2$ distance (FIG. 1) will vary with the motions associated with a vertical isolation mechanism. This effect can be included in the processor calculations based on inputs from a sensor which detects a distance between the platform and the floor 20. In addition, the vertical isolation system can be used to offset any potential raising or lowering of the head of the person 12 due to the combined rotation of the vehicle 10 (e.g. relative to the ground), and rotation of the seat 16 relative to the vehicle 10. The user control for controlling the location of the virtual pivot point can take variation in $L2$ with vertical displacement of the suspension into account so that the user can still use the user control to control the virtual pivot point location, regardless of how the vertical suspension displacement varies.

Figure 3:
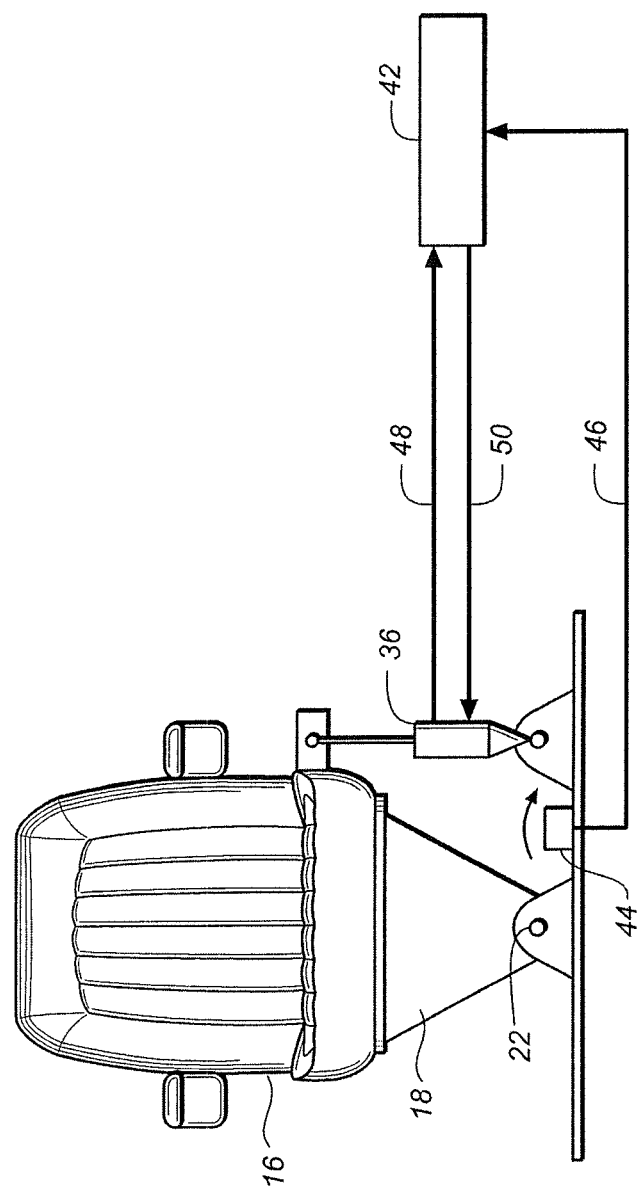
FIG. 3 is a front view of the seat of FIG. 2 secured to a floor of the tractor of FIG. 1A.

Turning to FIG. 3, operation of the actuator 36 is controlled by a processor 42. A sensor 44 can measure an aspect of motion which in this example is a roll rate of the vehicle 10. The processor 42 receives input from the sensor 44 in the form of roll rate data via a bus 46. The processor 42 calculates the integral of the roll rate data to determine an instantaneous roll angle $\theta_1$ (FIG. 1). The processor then plugs $\theta_1$ into the equation given above in paragraph 28 along with $L_2$ and $L_1$, and calculates $\theta_2$. Next, the processor 42 uses a lookup table to determine the desired actuator position in order to achieve the calculated $\theta_2$. Note that the processor 42 receives position data from the actuator 36 via a bus 48. The position data is indicative of a position of the actuator which is correlated to a position of the seat about the axis 22. As such, the processor is informed of the current position (e.g. displacement) of the actuator. It should be noted that the particular control law used by the processor to control $\theta_2$ is not important, and various control laws such as PI, PID, or other known control laws etc. can be used in the embodiments described herein.

The processor 42 then issues a command to the actuator 36 via a bus 50 which cause the actuator to move to the desired actuator position. By successively repeating these steps, the processor 42 utilizes input from the sensor 44 to determine a desired motion of the seat 16 about the axis 22, and then operates the actuator 36 to cause the desired motion of the seat 16 about that axis. This results in a substantial reduction (or minimizing) of the acceleration of a person's head sitting in the seat 16 in a substantially horizontal direction. Preferably the processor 42 controls motion of the seat 16 in order to reduce displacement of the virtual pivot point 33 along the reference vertical centerline 17 as the vehicle 10 is rotated (e.g. about the axis 24 in FIG. 1B). This example is advantageous in that it (a) is substantially insensitive to lateral accelerations caused by turning (when the vehicle makes a left or right turn) and gravity, and (b) requires minimal motion sensors. This arrangement assumes that there is a stationary roll center height (i.e. $L_1$ does not vary). As described earlier with respect to other examples, a user control that adjusts the value of $L_2$ used by the controller functions as a user control to control the location of the virtual pivot point.

If it is desired to calculate $L_1$ continuously in real time as the vehicle is moving, a lateral accelerometer (not shown) can be provided on, for example, the vehicle 10 or the seat 16. It is preferable that this accelerometer is located at substantially the same height (or location) as the axis 22. The processor 42 receives inputs from the lateral accelerometer and the roll rate sensor 44, and then calculates $L_1$ using the equation $L_1$=lateral velocity/roll rate where the lateral velocity is calculated by integrating the lateral acceleration signal. It should be noted that preferably gravity correction is done on the output of any lateral accelerometers described in this application. This means that the component of gravity coupled into the lateral accelerometer as the vehicle 10 and/or seat 16 rotates is taken into consideration. Dynamically calculating L1 does not affect the user control for controlling the virtual pivot point location via adjustment of the value of $L_2$.

In an alternative way of controlling the position of the seat 16 about the axis 22 in FIG. 3, the angle $\theta_3$ (FIG. 1B) is used instead of $\theta_2$. Once the processor determines the instantaneous roll angle $\theta_1$ as described above, the angle $\theta_3$ is determined by the equation $\theta_3=\theta_1\times(L_1/L_2)$. Next, the processor 42 uses a lookup table to determine the desired actuator position in order to achieve the calculated $\theta_3$. The processor 42 then issues a command to the actuator 36 via the bus 50 which cause the actuator to move to the desired actuator position in order to achieve the calculated $\theta_3$ angle. By successively repeating these steps, the processor 42 utilizes input from the sensor 44 to determine a desired motion of the seat 16 about the axis 22, and then operates the actuator 36 to cause the desired motion of the seat 16 about that axis. This control scheme can be done with a stationary roll center height $L_1$ or a time varying $L_1$ as described above.

Figure 4:
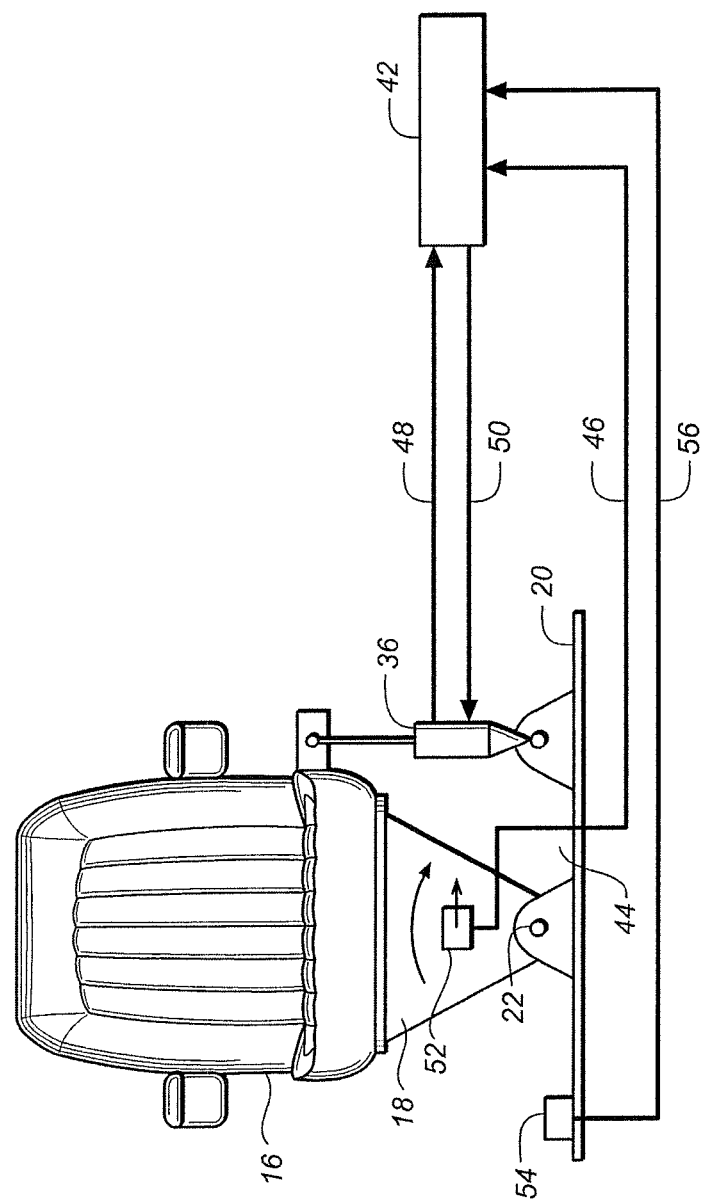
FIG. 4 is a front view of another example of a seat system.

With respect to FIG. 4, another example of a seat system is disclosed in which the vehicle roll rate sensor 44 of FIG. 3 has been removed, and a roll rate sensor 52 has been provided to rotate with the seat 16 as it is mounted on the intermediate support structure 18. The sensor 52 detects a roll rate of the seat 16 about the axis 22. A lateral accelerometer 54 has also been provided and is mounted on the floor 20 of the vehicle to detect a lateral acceleration of the vehicle.

The seat system can include a mechanism (not shown in the Figures) to lock the seat 16 in its home position (shown in FIG. 1A) under certain conditions. For example, if the engine is running but the vehicle is stopped with the transmission in park or neutral, or when the ignition of the vehicle is switched off, the actuator 36 will rotate the seat 16 to its home position. Alternatively, the seat system may include a centering spring (not shown in the Figures) that can also rotate the seat 16 towards its home position. A metal rod is then automatically inserted (e.g. by a solenoid or a spring) into a hole in the support structure 18 to lock the seat 16 in its home position. Then the electrical power to the actuator 36 is switched off.

Figure 5:
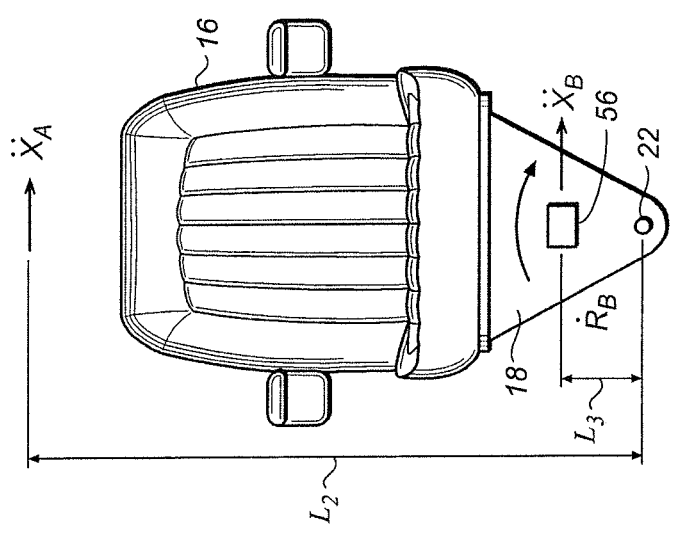
FIG. 5 is a modification of the seat of FIG. 4.

FIG. 5 shows a seat system which is a modification of the seat system of FIG. 4. The main difference is that the roll rate sensor 52 and lateral accelerometer 54 of FIG. 4 have been combined into a single sensor package 56 (mounted on the seat intermediate support structure 18). The processor 42 (not shown in FIG. 5) uses the inputs from the sensor package 56 in the same way as in FIG. 4. That is, the lateral acceleration of the axis 22 is given as $\ddot{X}_P=\ddot{X}_B-(d\dot{R}_B/dt\times L_3)$, where $\ddot{X}_B$ is the lateral acceleration measured by the accelerometer 54 (mounted to the seat in package 56), $d\dot{R}_B/dt$ is the rotational acceleration of the seat 16 which is obtained by differentiating the output $\dot{R}_B$ of the roll rate sensor 52 (mounted to the seat in package 56), and $L_3$ is the vertical distance between the axis 22 and the lateral accelerometer 54 in the package 56 (even if the sensor 54 is not vertically aligned with the axis 22). The calculated acceleration at the position of the head of a fictitious person who is sitting in the seat 16 is given as $\ddot{X}_A=\ddot{X}_P+(d\dot{R}_B/dt\times L_2)$. The processor 42 then utilizes the $\ddot{X}_A$ term to issue a command to the actuator 36 (not shown in FIG. 5) which operates to rotate the seat 16 about the axis 22 in an effort to drive the $\ddot{X}_A$ term to zero. This is done because we are trying to substantially reduce, minimize or eliminate lateral accelerations of a person's head who is sitting in seat 16. The equations used for the rotating seat examples in this application are effective for the relatively small angle rotations through which the seat is rotated.

In another example, the sensor package 56 is eliminated and a lateral accelerometer (not shown) is placed in a headrest (not shown) of the seat 16. The head rest, as is usual, can be adjusted to the height of the driver's head. The output of the lateral accelerometer is transmitted to the processor 42. The processor 42 uses the output from the lateral accelerometer to operate the actuator 36 in a way that substantially reduces, minimizes, or eliminates acceleration of the driver's head in a horizontal direction (in this case, laterally). Gravity correction will need to be done on the output of the lateral accelerometer, and centrifugal forces from vehicle cornering need to be addressed by, for example, providing another accelerometer somewhere on the vehicle that can measure these centrifugal forces. In this example, a user control for controlling the location of a virtual pivot point is accomplished by allowing the user to adjust the physical location of the lateral accelerometer. Either the height of the headrest can be adjusted by the user, or the lateral accelerometer can be mounted to the headrest using a mechanism that allows its position relative to the headrest to be changed by the user.

Referring to FIG. 6, another example of a seat system is shown in which the seat 16 can be rotated about two different axes. This seat can address issues with the vehicle 10 pitching forwards and backwards about a pitch axis (not shown) which is substantially parallel with a front axle (FIG. 1A) of the vehicle 10. The pitch axis may, for example be located at the height of the front axle. The intermediate seat support 18 has been reoriented ninety degrees about a vertical axis and is pivotally secured to a rocker plate 58. The rocker plate 58 is pivotally secured to the floor 20 of the vehicle 10. This arrangement allows the seat 16 to rotate about the axis 22 and an axis 62 which is substantially perpendicular to the axis 22 and substantially parallel with a horizontal plane. A distance $L_4$ is the height that the axis 62 is located above the pitch axis of the vehicle. A second actuator 64 is pivotally secured to the floor 20 and the seat 16. The control scheme described above with respect to FIG. 3 is generally used to control movement of the seat in FIG. 6. That is, operation of the actuators 36 and 64 is controlled by the processor 42. The sensor 44 measures a roll rate of the vehicle 10 about an axis parallel to the axis 22. A sensor 66 measures a pitch rate of the vehicle 10 about an axis parallel to the axis 62. The processor 42 receives inputs from the sensors 44 and 46 in the form of roll and pitch rate data via data buses.

The processor 42 calculates the integral of the roll rate data from the sensor 44 to determine an instantaneous roll angle $\theta_1$ (FIG. 1). The processor 42 also calculates the integral of the pitch rate data from the sensor 66 to determine an instantaneous pitch angle $\theta_4$. The processor then plugs $\theta_1$ into the equation given above in paragraph 29 along with $L_2$ and $L_1$, and calculates $\theta_2$. The processor also calculates $\theta_5=\theta_4\times(1+L_4/L_2)$. The distance $L_2$ is used because the axes 62 and 22 are located at about the same height). The angles $\theta_1$ and $\theta_2$ correspond respectively to the angles $\theta_4$ and $\theta_5$, the latter two angles being relevant to a side view of the tractor in which the tractor is pitched forwards or backwards.

Next, the processor 42 uses a lookup table to determine the desired actuator positions in order to achieve the calculated $\theta_2$ and $\theta_5$ angles. Actuators 36 and 64 will change only the angle $\theta_5$ when they are moved in unison. Actuators 36 and 64 will change only the angle $\theta_2$ when they are moved in opposition at the same velocities. Actuators 36 and 64 will change both the angle $\theta_2$ and the angle $\theta_5$ when they are moved at different velocities in the same or opposite directions. Note that the processor 42 receives position data from the actuators 36 and 64 by respective buses. The position data is indicative of a position of the actuators which is correlated to a position of the seat about the axes 22 and 62. As such, the processor is informed of the current position (e.g. extension) of the actuators.

The processor 42 then issues a command signal to each of the actuator 36 and 64 via respective buses which cause the actuators to move to the desired actuator positions. Note that the roll and pitch control signals for each actuator are combined by the processor 42 and then sent to the respective actuator 36 and 64. By successively repeating these steps, the processor 42 utilizes input from the sensors 44 and 66 to determine a desired motion of the seat 16 about the axes 22 and 62, and then operates the actuators 36 and 64 to cause the desired motion of the seat 16 about the axes. This example is advantageous in that it (a) is substantially insensitive to lateral accelerations caused by turning (when the vehicle makes a left or right turn) and gravity, as well as fore/aft accelerations caused by accelerating and braking the vehicle 10, and (b) requires minimal motion sensors. Note that the axes 22 and 62 are substantially orthogonal to each other. These axes can be oriented to be other than orthogonal to each other (i.e. other than 90 degrees offset from each other).

A user control 65 can be implemented to control the location of the virtual pivot point for the roll degree of freedom, as described earlier. Control 65 is depicted as a rotary control located on the armrest of the seat 16. A user control 67 can also be implemented to allow the user to control the virtual pivot point location for the pitch degree of freedom. Control 67 is depicted as a rotary control located on the armrest of seat 16. The location of the controls can be anywhere within reach of the seat occupant. While controls 65 and 67 are depicted as rotary knobs, other control types as known in the art could be used. In one non-limiting example, both virtual pivot point locations can be controlled by a single user control. A user may wish for both virtual pivot point locations to be placed at the same height, or a user may wish them to differ. Having a separate user control for each degree of freedom can allow the user to independently control virtual pivot point locations associated with multiple degrees of freedom simultaneously. In one non-limiting example, the virtual pivot point location for the vehicle roll degree of freedom is chosen to be at a lower height than the virtual pivot point location (height) for the vehicle pitch degree of freedom. For example, when the seat occupant is reading, the roll virtual pivot point location may be set to be the height of the reading material (or possibly the height of a tray associated with the seat, or the height of the seat occupant's lap), while the roll virtual pivot location is chosen to be higher, such as at the height of the seat occupant's head.

Turning to FIG. 7, another example of a seat system is provided in which the seat 16 is translated substantially parallel to the axis 62 instead of being rotated about one or both of axes 22 and 62. This system addresses issues with the vehicle 10 rolling about the axis 24 (FIG. 1B). A different intermediate seat support structure 68 is provided which is secured to a pair of rails 70 via four linear bearings 72. The seat 16 can be moved along the axis 62 on the rails 70 by an actuator 74 which is connected to the intermediate seat support structure 68 and the floor 20 of the vehicle. As above, the actuator 74 reports its current position state to the processor 42 and receives movement commands from the processor over a pair of data buses. The roll rate sensor 44 provides a vehicle roll rate about the axis 24 (FIG. 1B) to the processor 42. The processor 42 calculates the integral of the roll rate data to determine an instantaneous roll angle $\theta_1$ (FIG. 1). It should be noted that even though a translation of the seat 16 (and the driver's head) is being used to offset a rotation of the vehicle (and the driver's head), most of the movement that the driver's head would experience from vehicle roll is side-side (very little is up and down), so this is an acceptable solution to the problem.

The processor then plugs $\theta_1$ into the equation $\Delta X_{head} = (L_1 + L_2) \times \theta_1$, where $\Delta X_{head}$ is the distance a person's head sitting in the seat 16 needs to be moved side-to-side to counteract rolling of the vehicle about the axis 24. For example, when the vehicle has rotated counter-clockwise (e.g. about the axis 24 in FIG. 1B) by an angle $\theta_1$, the driver's head is translated to the right parallel to the axis 62 by a distance $\Delta X_{head}$. Next, the processor 42 uses a lookup table to determine the desired position of the actuator 74 in order to achieve the calculated $\Delta X_{head}$. The processor 42 then issues a command to the actuator 74 which cause the actuator 74 to move to the desired actuator position. By successively repeating these steps, the processor 42 utilizes input from the sensor 44 to determine a desired motion of the seat 16 along the axis 62, and then operates the actuator 74 to cause the desired motion of the seat 16 along that axis. This example is advantageous in that it (a) is substantially insensitive to lateral accelerations caused by turning (when the vehicle makes a left or right turn) and gravity, and (b) requires minimal motion sensors. This arrangement assumes that there is a stationary roll center height (i.e. $L_1$ does not vary). If it is desired to use a time varying $L_1$, a lateral accelerometer can be used as described above. Rotating seat systems like those shown in FIGS. 1-6 need less clearance around the seat at the height of the axis of rotation of the seat (e.g. about axis 22) so that the seat does not hit another part of the vehicle (e.g. the cab 11) as the seat is rotated. For a rotating seat this clearance requirement increases with distance above the axis of rotation. This allows the cab 11 to be designed with a narrower base. Translating seat systems such as the one shown in FIG. 7 need roughly the same clearance at all heights above the seat base. A user control to allow the user to control the location of the virtual pivot point can be implemented as described previously, where adjustment of the control changes the value of $L_2$ used to calculate $\Delta X_{head}$ as described above.

Figure 8:
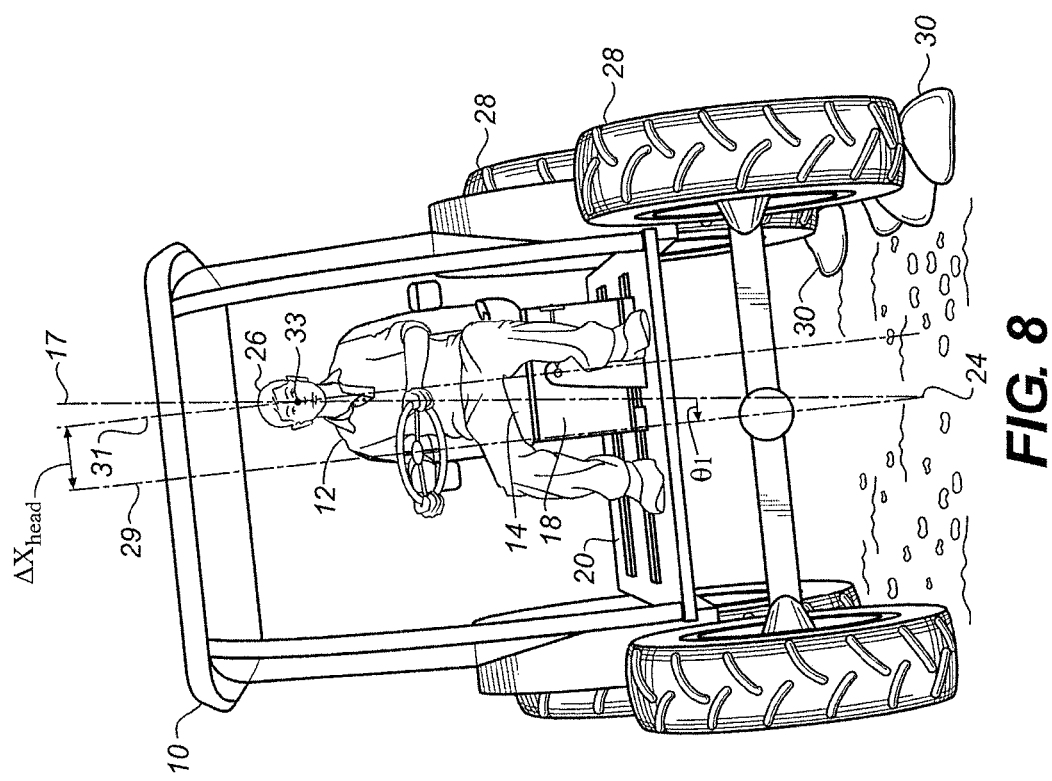
FIG. 8 is similar to FIG. 1B except that the seat system of FIG. 7 is shown in place of the seat system in FIG. 1B.

FIG. 8 is similar to FIG. 1B except that the translating seat system of FIG. 7 has replaced the rotating seat system of FIG. 1B. Here we can see that $\Delta X_{head}$ is the distance between the seat centerline 31 and the vehicle centerline 29. If the home position of the seat is not centered in the vehicle, then $\Delta X_{head}$ is the distance between the seat centerline 31 and the home position of the seat. The seat has been translated to the right (as viewed in FIG. 8) by a distance $\Delta X_{head}$ so that the head of the person 12 remains substantially on the vertical centerline 17.

FIG. 9 shows a seat system that is similar to the seat system shown on FIG. 7 except that in FIG. 9 the seat 16 is being moved forwards and backwards substantially parallel to the axis 22 instead of side-to-side. This system addresses issues with the vehicle 10 pitching about the pitch axis (discussed above). The intermediate seat support structure 68 is substantially the same as in FIG. 7. However, a pair of rails 73 and four linear bearings 75 are provided instead of the rails 70 and the bearings 72 which allow the seat 16 to be moved forwards and backwards. The seat 16 can be moved substantially parallel to the axis 22 on the rails 73 by an actuator 76 which is connected to the intermediate seat support structure 68 and the floor 20 of the vehicle. As above, the actuator 76 reports its current position state to the processor 42 and receives movement commands from the processor over a pair of data buses. The pitch rate sensor 66 provides a vehicle pitch rate about the pitch axis to the processor 42. The processor 42 calculates the integral of the pitch rate data to determine an instantaneous pitch angle $\theta_4$.

The processor then plugs $\theta_4$ into the equation $\Delta Y_{head} = (L_4+L_2) \times \theta_4$, where $\Delta Y_{head}$ is the distance a person's head sitting in the seat 16 needs to be moved forwards or backwards to counteract pitching of the vehicle about the pitch axis. Next, the processor 42 uses a lookup table to determine the desired position of the actuator 76 in order to achieve the calculated $\Delta Y_{head}$. The processor 42 then issues a command to the actuator 76 which cause the actuator 76 to move to the desired actuator position. By successively repeating these steps, the processor 42 utilizes input from the sensor 66 to determine a desired motion of the seat 16 substantially parallel to the axis 22, and then operates the actuator 76 to cause the desired motion of the seat 16 substantially parallel to that axis. This example is advantageous in that it (a) is substantially insensitive to accelerations and decelerations caused by pressing the gas pedal or brake pedal of the vehicle 10, and gravity, and (b) requires minimal motion sensors. This arrangement assumes that there is a stationary pitch center height (i.e. $L_4$ does not vary). If it is desired to use a time varying $L_4$, a fore-aft accelerometer can be used as described above. Again, a user control that allows the user to adjust the virtual pivot points in roll, pitch, or both roll and pitch can be implemented as described earlier. The control adjusts the value of $L_2$ used by the controller to calculate desired output forces of the actuators. In general, the virtual pivot points in roll and pitch are independent of each other, and each can be set as desired by a user.

In FIG. 10 a seat system is shown in which the seat 16 can be moved both side-to-side and forwards/backwards. The intermediate seat support structure 68 is secured to the rails 70 via the four linear bearings 72 as in FIG. 7. However, the rails 70 are secured to a plate 78 which is interposed between the floor 20 of the vehicle 10 and the intermediate support structure 68. The plate 78 is secured to the four linear bearings 75 which travel along the rails 73. The rails 73 are secured to the floor 20 of the vehicle 10 as in FIG. 9. With this arrangement, the seat 16 can be moved substantially parallel to the axis 62 on the rails 70 by the actuator 74 which is connected to the seat intermediate support structure 68 and the plate 78. In addition, the seat 16 can be moved substantially parallel to the axis 22 on the rails 73 by the actuator 76 which is connected to the plate 78 and the floor 20 of the vehicle. As above, the actuators 74 and 76 report their current position state to the processor 42 and receive movement commands from the processor over a pair of wireless data buses 80.

The roll rate sensor 44 provides a vehicle roll rate about the axis 24 to the processor 42. The pitch rate sensor 66 provides a vehicle pitch rate about the pitch axis (FIG. 6) to the processor 42. The processor 42 calculates the integral of the roll rate data and the pitch rate data to determine instantaneous roll angle $\theta_1$ and pitch angle $\theta_4$. Next, the processor 42 calculates the integral of the (a) roll rate data to determine an instantaneous roll angle $\theta_1$, and (b) pitch rate data to determine an instantaneous pitch angle $\theta_4$. Then the processor plugs $\theta_1$ into the equation $\Delta X_{head} = (L_1+L_2) \times \theta_1$, where $\Delta X_{head}$ is the distance a person's head sitting in the seat 16 needs to be moved side-to-side to counteract rolling of the vehicle about the axis 24. The processor then plugs $\theta_4$ into the equation $\Delta Y_{head} = (L_4+L_2) \times \theta_4$, where $\Delta Y_{head}$ is the distance a person's head sitting in the seat 16 needs to be moved forwards or backwards to counteract pitching of the vehicle about the pitch axis. The processor 42 uses a lookup table to determine the desired position of (a) the actuator 74 in order to achieve the calculated $\Delta X_{head}$, and (b) the actuator 76 in order to achieve the calculated $\Delta Y_{head}$. The processor 42 then issues a command to the actuators 74 and 76 which cause the actuators 74 and 76 to move to the desired actuator positions. By successively repeating these steps, the processor 42 utilizes input from the sensors 44 and 66 to determine a desired motion of the seat 16 substantially parallel to the axes 22 and 62, and then operates the actuators 74 and 76 to cause the desired motion of the seat 16 substantially parallel to these axes. This example is advantageous in that it (a) is substantially insensitive to accelerations in a horizontal plane and gravity, and (b) requires minimal motion sensors. This arrangement assumes that there are stationary roll and pitch center heights (i.e. $L_1$ and $L_4$ do not vary). If it is desired to use a time varying $L_1$ and/or $L_4$, lateral and fore-aft accelerometers can be used as described above.

FIG. 6 depicts a two degree of freedom motion compensation system that allows control over motion in both the roll and pitch degrees of freedom, where roll and pitch motions are compensated by a suspension system employing pivoting motion along axes 22 and 62 respectively. FIG. 10 depicts a two degree of freedom motion compensation system that allows control over motion in both the roll and pitch degrees of freedom, where roll and pitch motions are compensated by a suspension system employing translating motion along axes 62 and 22 respectively. It is also possible to compensate for motion in one of the roll or pitch degrees of freedom using pivoting motion as shown in FIG. 2 (or as shown in either one of the degrees of freedom compensated in FIG. 6), and compensating for motion in the other of the roll and pitch degrees of freedom using translating motion, as shown in FIGS. 7 and 9. In one non-limiting example roll motion is actively compensated by an active pivoting motion control system while pitching motion is actively compensated by a linear suspension system. In one non-limiting example, roll motion is actively compensated by an active pivoting motion control system while pitching motion is passively compensated by a passive linear suspension system.

Figure 11:
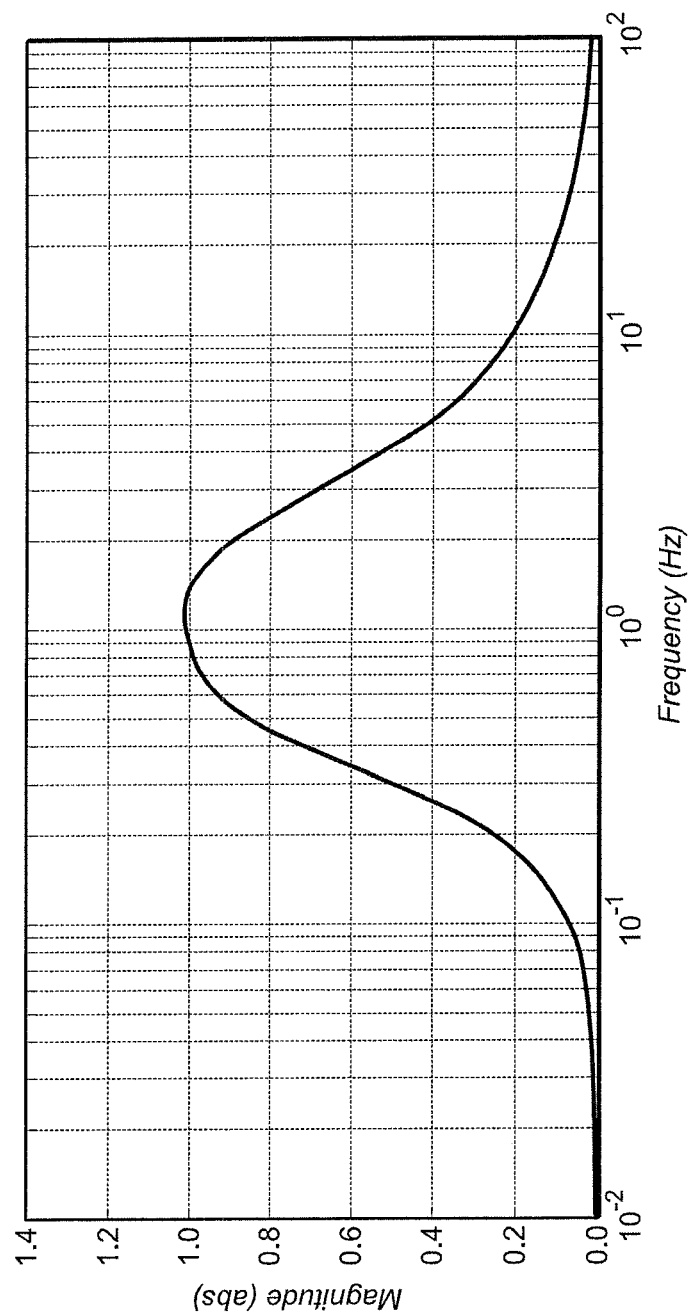
FIG. 11 is a plot of frequency versus a magnitude of the sensitivity of a human to lateral accelerations.

FIG. 11 shows a plot of frequency versus a magnitude of the sensitivity of a human to lateral acceleration. It can be seen that humans are most sensitive to lateral accelerations in the vicinity of 1 hz. Humans are not very sensitive to lateral accelerations below 0.1 hz or above 30 hz. The bandwidth of vehicle rotation that is addressed by the seat system is preferably between about 0.2 hz to about 8 hz, and more preferably between about 0.1 hz to about 40 hz.

A number of implementations have been described. Nevertheless, it will be understood that additional modifications may be made without departing from the spirit and scope of the inventive concepts described herein, and, accordingly, other embodiments are within the scope of the following claims. For example, another embodiment can include a seat that is both translated and rotated. This can be accomplished by modifying the seat shown in FIG. 10 so that the arrangement for moving the seat side-to-side is replaced by an arrangement for rotating the seat about an axis parallel to the axis 22 (e.g. as shown in FIG. 2).

In another version of a seat that is both translated and rotated, the seat system in FIG. 10 is modified to replace the portion of the system that moves the seat forwards and backwards with the portion of FIG. 2 that rotates the seat 16 about the axis 22. If the seat is translated to the right (as viewed in FIG. 10), the seat would also be rotated clockwise. However, as the translation and rotation of the seat are being combined together, both motions can be done to a lesser extent as compared to a system where only rotation (e.g. FIG. 2) or translation (FIG. 7) was used.

In all of the examples described above, the vehicle roll axis 24 was always shown located below the axis 22 about which the seat 16 is rotated (or below the level on which the seat is translated). The arrangements described above can also be used where a vehicle roll axis is located above a seat rotation axis or translation level. This can occur in a tram where a vehicle is suspended from a cable located above the vehicle.

In another example, the axis 22 (see FIG. 1) can be a virtual pivot made with, for example, a four-bar linkage or circular track. This arrangement will provide some degree of lateral translation at the floor 20, but without requiring the use of a second actuator. A benefit of this arrangement is that it reduces the lateral acceleration in the torso of a person sitting in the seat 16. This example will consume more sway space and create more relative motion between the person 12 and the pedals/steering wheel of the vehicle 10.

In a further example, the cab 11 is moved relative to another portion of the vehicle (e.g. the frame or fenders) in order to keep the virtual pivot point 33 located substantially along the reference vertical centerline 17. Such movement of the cab 11 can be in place of moving the seat 16 (in this case the seat 16 is secured in place relative to the cab 11), or in addition to moving the seat 11 (in this case the seat 16 is moved relative to the cab 11 and the cab 11 is moved relative to another portion of the vehicle 10). In the former case, the cab is moved by one or more of $\Delta X_{head}$, $\Delta Y_{head}$, $\theta_2$ and $\theta_4$ as described above relative to another portion of the vehicle. In the latter case, the combined motion of the seat 16 relative to the cab 11, and the cab 11 relative to another portion of the vehicle is set to be one or more of $\Delta X_{head}$, $\Delta Y_{head}$, $\theta_2$ and $\theta_4$ as described above. In this latter case the seat and cab move in the same direction which provides more travel room for the seat relative to the cab. U.S. Pat. No. 5,044,455, incorporated herein by reference, discloses actively moving a cab of a truck to address pitching of the truck as the truck travels over a road. The cab 11 can be moved as described in the '455 patent to address pitch and/or roll motions of the vehicle 10 under the control scheme described above.

The examples described above may include a processor with computer components and computer-implemented steps that will be apparent to those skilled in the art. For example, it should be understood by one of skill in the art that computer-implemented steps of a processor may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, controllers, discrete logic, ASICs, or other programmable logic device, or may be performed by analog circuitry, or by a combination of analog and digital circuitry.

What is claimed is:

1. A seat system for a vehicle, comprising:
an active suspension system for isolating a suspended plant from vibration applied to a base of the active suspension when the active suspension base is affixed to a vehicle, the active suspension system constructed and arranged to isolate the suspended plant from vibration in a first degree of freedom selected from the group consisting of: vehicle roll and vehicle pitch, and;
a seat affixed to the suspended plant, wherein the active suspension system comprises;
an actuator for outputting force to affect the suspended plant in the first degree of freedom,
sensors to sense motion of the suspended plant in the first degree of freedom,
a controller for providing a command to the actuator to cause it to output force to affect motion of the suspended plant, wherein the combined motion of the vehicle relative to the earth in the first degree of freedom with the motion of the suspended plant relative to the vehicle results in a motion of the suspended plant which pivots about a virtual pivot point having a height, and;
a user operable control constructed and arranged to allow the user to adjust the height of the virtual pivot point.

2. The seat system of claim 1, wherein the active suspension causes the suspended plant to pivot with respect to the suspension base about a first axis, where the user control controls the height of the virtual pivot point above the first axis.

3. The seat system of claim 2, wherein the user control allows the user to continuously vary the virtual pivot point height above the first axis over a first range of heights, where the first range extends from the height of the first axis to a height at least as high as the top of the head of an occupant of the seat.

4. The seat system of claim 2, wherein the user control allows the user to continuously vary the virtual pivot point height above the first axis over a first range of heights, where the first range extends from the height of the first axis to the height of a roof of the vehicle interior.

5. The seat system of claim 2, wherein the user control allows the user to vary the virtual pivot point height above the first axis among a plurality of predetermined heights.

6. The seat system of claim 5, wherein one of the plurality of predetermined heights is the average height at which an occupant of the seat holds reading material.

7. The seat system of claim 5, wherein one of the plurality of predetermined heights is a height between about 6 to 12 inches above of the lap of an occupant of the seat.

8. The seat system of claim 5, wherein one of the plurality of predetermined heights is the height of a top surface of a tray arranged for use by the occupant of the seat.

9. The seat system of claim 2, further comprising a location sensor for sensing its vertical height within the vehicle and outputting its height information to the controller, wherein the controller outputs commands to the actuator to cause it to output forces such that the height of the virtual pivot point is set at the vertical height of the location sensor.

10. The seat system of claim 9, wherein the location sensor senses acceleration in at least one degree of freedom.

11. The seat system of claim 9, wherein the physical location of location sensor in the vehicle is capable of being changed by a seat occupant.

12. The seat system of claim 9, wherein the location sensor is capable of being fixed to the suspended plant.

13. The seat system of claim 1, further comprising a sensor for detecting a condition of the seat, wherein the location of the virtual pivot point is automatically changed when the sensor detects the condition.

14. The seat system of claim 13, wherein the condition is a user change in seat position.

15. A seat system for a vehicle, comprising:
an active suspension system for isolating a suspended plant from vibration applied to a base of the active suspension when the active suspension base is affixed to a vehicle, the active suspension system constructed and arranged to isolate the suspended plant from vibration in a first degree of freedom selected from the group consisting of: vehicle roll and vehicle pitch, and;
a seat affixed to the suspended plant, wherein the active suspension system comprises;
an actuator for outputting force to affect the suspended plant in the first degree of freedom,
sensors to sense motion of the suspended plant in the first degree of freedom,
a controller for providing a command to the actuator to cause it to output force to affect motion of the suspended plant, wherein the combined motion of the vehicle relative to the earth in the first degree of freedom with the motion of the suspended plant relative to the vehicle results in a motion of the suspended plant which pivots about a virtual pivot point having a height,
a tray associated with the seat system, and;
a user operable control constructed and arranged to allow the user to adjust the height of the virtual pivot point wherein the virtual pivot point height is automatically set to a first height when the tray is stowed, and the virtual pivot point is automatically set to a second height when the tray is deployed.

16. The seat system of claim 15, wherein a first time delay is used to delay between the time the tray is deployed and the time the virtual pivot point height is changed from the first height to the second height.

17. The seat system of claim 16, wherein a second time delay is used to delay between the time the tray is stowed and the time the virtual pivot point height is changed from the second height to the first height.

18. A seat system for a vehicle, comprising:
an active suspension system for isolating a suspended plant from vibration applied to a base of the active suspension when the active suspension base is affixed to a vehicle, the active suspension system constructed and arranged to isolate the suspended plant from vibration in a first degree of freedom selected from the group consisting of: vehicle roll and vehicle pitch, and;
a seat affixed to the suspended plant, wherein the active suspension system comprises;
a first actuator for outputting force to affect the suspended plant in the first degree of freedom,
sensors to sense motion of the suspended plant in the first degree of freedom,
a controller for providing a command to the first actuator to cause it to output force to affect motion of the suspended plant, wherein the combined motion of the vehicle relative to the earth in the first degree of freedom with the motion of the suspended plant relative to the vehicle results in a motion of the suspended plant which pivots about a first virtual pivot point having a height,
a second actuator for outputting second forces to affect the suspended plant in a second degree of freedom to generate second compensated motion so that the suspended plant is controlled in both the vehicle roll and vehicle pitch degrees of freedom, wherein the combined motion of the vehicle in the second degree of freedom with the compensated motion of the suspended plant in the second degree of freedom results in a motion of the suspended plant in the second degree of freedom that effectively pivots about a second virtual pivot point associated with the second degree of freedom, the second virtual pivot point also having a height, and;
a user operable control constructed and arranged to allow the user to adjust the height of the first virtual pivot point.

19. The seat system of claim 18, wherein the user control allows the user to control the heights of both the first and second virtual pivot points.

20. A seat system for a vehicle, comprising:
a seat including a seat bottom on which a person can sit, wherein a first imaginary reference vertical centerline passes through a body of a person who is sitting in the seat when both the seat and the vehicle are in a nominal, level horizontal orientation;
an intermediate support structure secured to the seat and the vehicle which allows the seat to move relative to the vehicle;
a first actuator that can interact with the seat to cause the seat to move relative to the vehicle;
one or more sensors which can each measure an aspect of motion; and
a processor that can (i) receive input from each of the one or more sensors, and (ii) utilize the input to determine a desired movement of the seat relative to the vehicle such that a combined motion of the seat relative to the vehicle and the vehicle relative to earth results in motion of the person about a virtual pivot point located substantially along the reference vertical centerline, and;
a user operable control which allows the user to control the location of the virtual pivot point.

* * * * *